Dec. 4, 1951   J. H. BREWER   2,577,069
INHIBITION ZONE READER

Filed May 25, 1949   2 SHEETS—SHEET 1

Inventor:
John H. Brewer,
By Pierce, Scheffler & Parker,
Attorneys.

Dec. 4, 1951 J. H. BREWER 2,577,069
INHIBITION ZONE READER
Filed May 25, 1949 2 SHEETS—SHEET 2
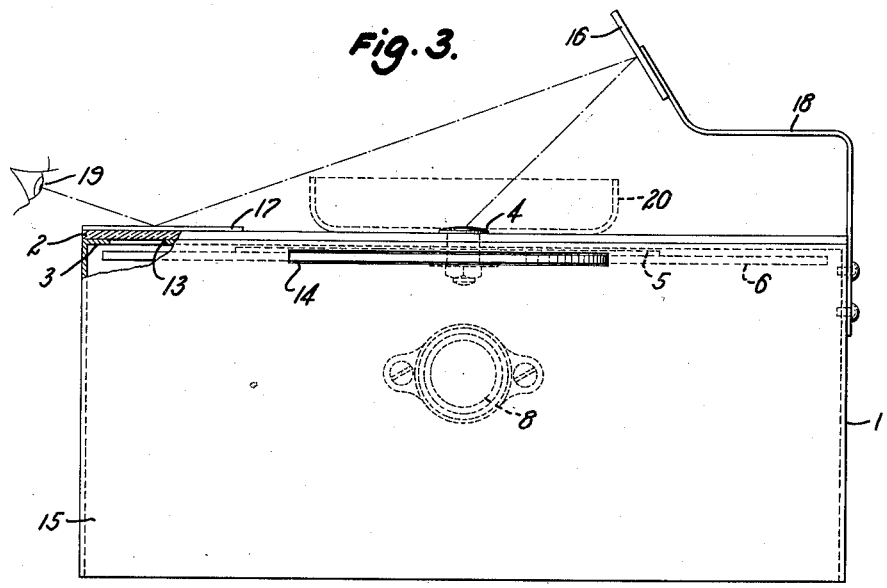
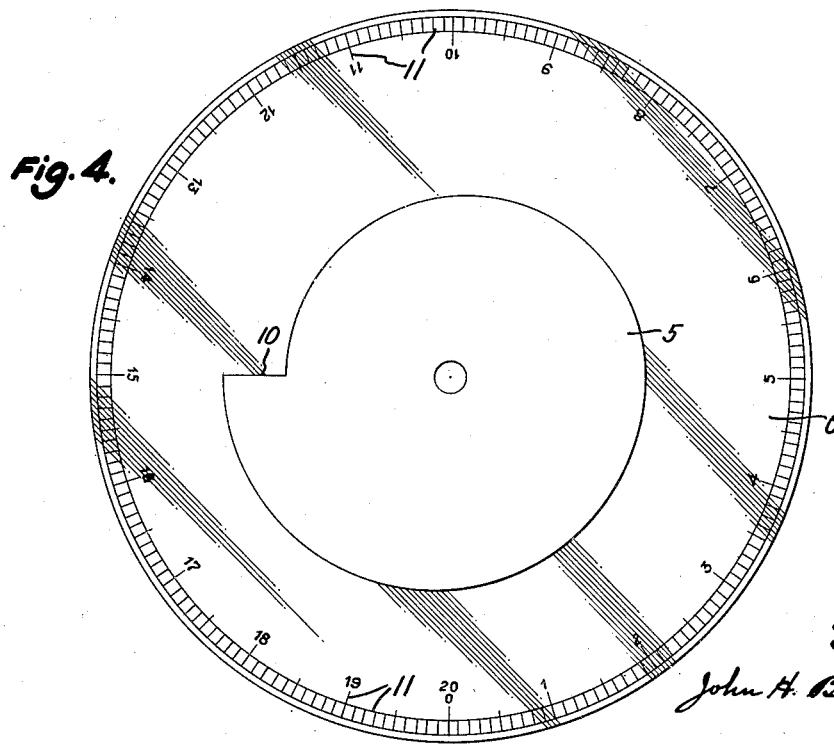

Patented Dec. 4, 1951

2,577,069

UNITED STATES PATENT OFFICE 2,577,069

INHIBITION ZONE READER

John H. Brewer, Baltimore, Md., assignor to Hynson, Westcott & Dunning, Incorporated, a corporation of Maryland Application May 25, 1949, Serial No. 95,227

1 Claim. (Cl. 33—125)

The present invention relates to distance measuring apparatus particularly useful in the microbiological evaluation of the potency of antibiotic compositions, for instance, in the assay of penicillin, where it is required that the diameters of zones of inhibition produced by the test liquids within a bacteria culture be accurately determined.

A common procedure for the assay of antibiotic compositions involves inoculating a layer of agar culture medium in a Petri dish with an organism, introducing a precisely measured amount of the antibiotic under study onto each of several spots on the surface of the culture medium while similarly placing a measured amount of an antibiotic of known potency onto other spots, and then incubating the thus prepared medium in the Petri dish until there has been a requisite multiplication of the organism over the surface of the medium except in those zones where the antibiotics have inhibited growth of the organism. The area of each more or less circular inhibited zone is directly related to the potency of the inhibiting antibiotic. Therefore, accurate determination of the diameters of the inhibited zones caused by the composition under study, along with accurate measurement of the diameters of those zones inhibited by the antibiotic of known potency will provide the necessary data for computing the potency of the substances under study.

It is highly desirable that the readings of the diameters of the inhibited areas be accurate within at least 0.1 mm., but since the zones to be measured are somewhat irregular and the edges of the zones are defined only by a difference in shade or transparency of the agar culture it is difficult to obtain quick reliable readings of this accuracy with the instruments generally available.

It is an object of the present invention to provide means utilizing the principles both of optics and mechanics whereby accurate measurement of the diameters of the inhibition zones within a transparent Petri dish bacteria colony can be made with facility and with the limit of error approaching or equal to ±0.01 mm.

It is a further object to provide a simple, inexpensive instrument for quickly measuring small distances with a high degree of accuracy.

Another object is provision of an instrument adapted to indicate linear dimensions of objects offset from and out of physical contact with the measuring edges or surfaces of the measuring instrument.

In general terms, the invention comprises a caliper having a stationary measuring edge and a rotatable spiral cam, and optical means for aligning the caliper with the points between which the measurement is to be taken.

The invention is illustrated in the accompanying drawings in which:

Fig. 3 is an end elevation of the reader of Fig. 1 with illustration of the preferred method of sighting for proper alignment of the edge of an inhibition zone; and Fig. 4 is top plan view of a camming means suitable for employment in the invention.

Figure 1:
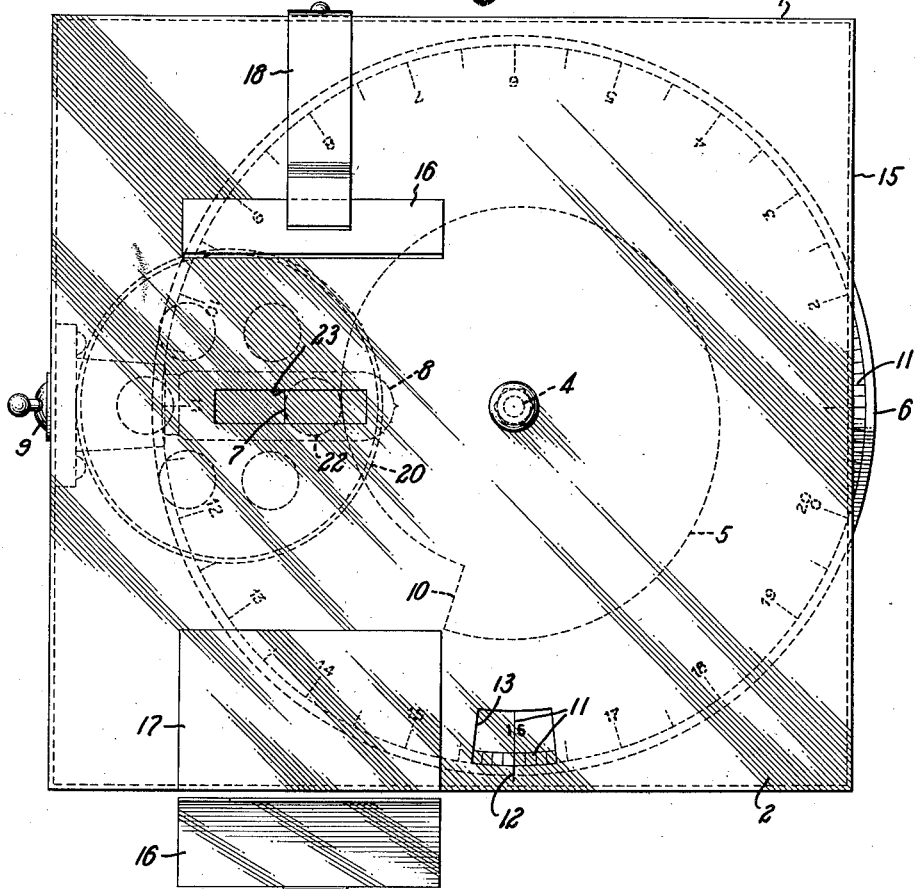
Fig. 1 is a top plan view of an inhibition zone reader made in cabinet form.

With reference to the drawings, it will be seen that 1 is a cabinet having a cover 2 of translucent material such as opal glass which is superimposed over opaque cabinet top 3. A shaft 4 carried by and passing through the translucent cabinet cover 2 and opaque cabinet top 3 supports a rotatable assembly comprising an opaque spiral cam disk 5, and fixedly secured thereto a transparent circular disk 6, the centers of the transparent circular disk 6 and the opaque spiral disk 5 being co-axially aligned on the shaft.

It will be understood that since each point on the curved periphery (measuring edge) of the spiral disk 5 is a given distance from the center of the spiral, which distance is different from that between any other point on the curved periphery of the spiral and the center thereof, it is a simple matter to calibrate the spiral for measurement of distances between the nearest edge thereof (effective measuring edge) and a fixed point spaced from the disk and in the plane thereof.

In accordance with this principle, means providing a zero indicia, which may comprise a line 7 on the translucent cover 2 is associated with the rotatable assembly. The zero indicia line 7 is substantially perpendicular to the radius of the spiral extended through the effective measuring edge (nearest portion of the periphery) thereof.

In order that the measuring edge of the spiral may be observed, an elongated rectangular opening 23 lying along the extension of the radius of the spiral which passes through the center of the zero indicia, is provided in the opaque cabinet top 3, and a light source 8, controlled by a switch 9 is mounted in a side wall of the cabinet directly beneath the elongated rectangular opening. It will be obvious that when a beam of light passes upwardly from the light source 8, it will pass through the transparent circular disk 6 and cast a shadow of the opaque spiral disk 5 onto the cabinet top 3. The shadow of that portion of the spiral disk which extends over the elongated rectangular opening will be cast on the translucent cabinet cover 2 and will be observable in sharp outline from above the cabinet. As the opaque spiral disk 5 is rotated, the length of the shadow appearing on the translucent glass cover 2 will increase or decrease, depending upon the direction of rotation of the spiral disk. The minimum and maximum available shadow lengths are of course controlled by the length of cut-off 10, the size of which is in turn dictated by the conformity of the spiral.

In the device of Fig. 1, if the cut-off is 20 mm. in depth, and its outer end is on a radius equal to the distance of the zero indicia line from the center of the spiral, measurements of 0 to 20 mm. between the zero indicia and the periphery of the spiral may be taken.

The spiral is calibrated accordingly, and corresponding graduated indicia 11 are marked around the outer portion of the transparent circular disk 6 whereby readings of smaller order may be taken with facility. An index 12 for determination of the readings is provided on the cover 2 over an opening 13 provided in the opaque cabinet top 3 which exposes the transparent circular disk 6 and the graduations 11 thereon. The cover 2 preferably is made transparent in the region above the opening 13 in order that the graduations may be read by reflection rather than in silhouette. Alternatively the cover may be cut away to form an opening. It will be noted from Figs. 1 and 4 that the illustrated device is provided with major numbered graduations of 1 mm. each and un-numbered graduations of 0.1 mm. each. Obviously, the instrument would be readable to accurate one-hundredths of a millimeter by further graduation and provided proper alignment of the measuring edges and graduation were accomplished. The latter steps can be facilitated by any number of simple means known to the art such as microscopic viewers, contacting adjacency of the parts, etc.

The rotatable assembly is intended to be rotated by hand, and to this end, an opening 14 is provided in cabinet end wall 15 and an edge of the circular disk extends through to the exterior of the cabinet.

Two sighting mirrors 16 and 17 are mounted on the cabinet for accuracy in the alignment of the edges of an object to be measured with the measuring edges of the spiral cam caliper, e. g. the zero indicia line and the portion of the periphery of the spiral which appears in the elongated rectangular opening. The mirror 16 is carried by a support 18 which holds it above and slightly to the rear of the rectangular opening. This mirror, in cooperation with the mirror 17, which may be fixed flat onto the translucent cabinet cover 2 as shown, serves to reduce error in alignment resulting from the parallax principle, the method of sighting for alignment being illustrated in Fig. 3 wherein 19 represents a sighting eye of the operator. Obviously, a third mirror may be employed to further reduce the possible error.

Figure 2:
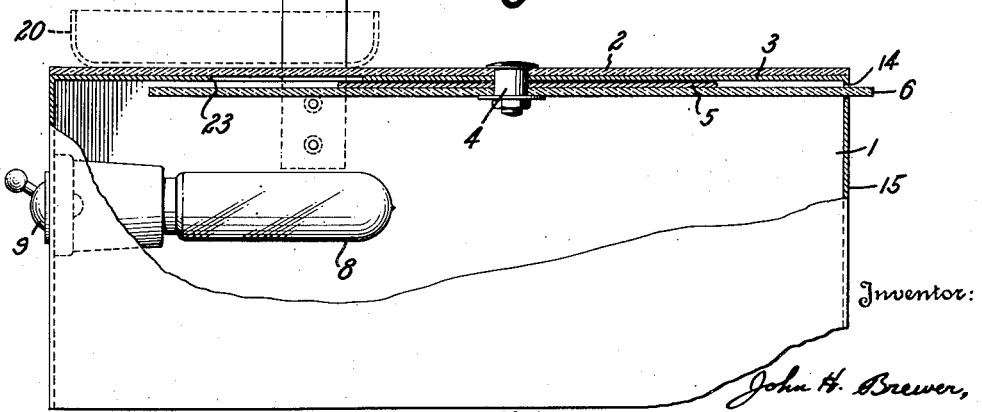
Fig. 2 is a side elevation of the reader of Fig. 1 in part cut away to reveal elements in the interior of the cabinet.

When the apparatus is used for reading the diameters of inhibition zones in assay of an antibiotic, a Petri dish 20, shown in dotted lines in Figs. 1-3, containing the bacteria colony and having more or less circular zones (also shown in dotted lines) of inhibited growth, is placed on the translucent cabinet cover 2. The interior of the cabinet is illuminated by energization of the light source 8 by means of the switch 9, and the Petri dish is then moved by the operator until the particular zone 22 to be measured is substantially centered over the elongated rectangular opening 23 and the left edge of the zone 22 is aligned tangent to the zero indicia line 7, the mirrors 16 and 17 being employed to reduce error of the operator in obtaining proper alignment by the sighting operation. The zone being properly aligned, the operator then manually rotates the circular transparent disk 6 by contact of the hand with the right edge portion of the disk 6 extending through the opening 14 in the right hand end wall 15 of the cabinet. Rotation of the circular transparent disk is continued until the edge of the shadow formed by the opaque spiral cam disk 5 is aligned tangent to the right hand edge of the inhibited zone 22 (Fig. 1) as determined by sighting from the mirrors. When this condition is reached, the linear distance between the zero indicia 7 and the effective measuring (nearest) edge of the spiral will be equal to the diameter of the zone under observation, and the reading of the distance will appear in the opening 13 as indicated by the index 12 on the scale graduations 11. As shown schematically in Fig. 1, the diameter of the observed zone 22 is recorded as 16.0 mm. The next zone to be read is then moved into position by displacement of the Petri dish and the operations are repeated until the proper calibration of its diameter is recorded by the index 12.

Obviously, any of a number of means known in the art, such as for example a spring clip assembly, may be mounted on the cabinet to hold the Petri dish and provide for its movement into alignment by means of adjusting nuts, etc. If desirable, such a means can be used in association with a turntable assembly of transparent material whereby successive readings on different zones in a dish may be facilitated by merely turning the table to bring the zones successively into preliminarily aligned positions.

While the cabinet cover 2 has been described as being of a translucent material, it is obvious that transparent material (as indicated by shading of the drawings) either clear or colored, can be employed. Translucent material is preferred, since the operator can thereby observe a distinct clear cut shadow immediately adjacent the bottom of the Petri dish and not be exposed to glare from the light source. If transparent material is employed for the cabinet cover, it will be desirable to tone down the intensity of the illumination by using either colored transparent material, a filter, or a colored light source, but in any event, the operator will be able to see the shadow of the spiral. Rather than use a completely clear transparent cabinet cover, the cover may be dispensed with entirely, whereupon the upper surface of the cabinet will comprise the opaque top 3.

However, the concept of the invention is adapted for utilization in embodiments other than the illustrated cabinet form apparatus, e. g. the apparatus may comprise merely a Petri dish support, the rotating assembly with means providing a zero indicia, and a light source, with either artificial or natural light being employed. In the case of natural light, however, direct alignment without a translucent member may be necessary unless the light is focused to give a sufficiently distinct shadow edge line.

In the illustrated embodiment, the light source 8 preferably is adapted to originate light over an elongated region whereby the line of demarcation between shadow and light appearing on the cabinet cover is in a plane normal to the measuring edge of the spiral regardless of the disposition of the measuring edge relative to the long axis of the light source.

The rotating assembly comprising the opaque spiral cam disk and the transparent circular disk affixed thereto is subject to various modifications within the concept of the invention. In the illustrated embodiment, the spiral is of sheet material secured onto the surface of the circular disk. Alternatively, the spiral may be inserted within the body of the circular disk or it may be merely painted onto the surface, either in full or in the form of an opaque line of the proper conformity. It may be desirable, especially where a clear transparent cabinet cover is used, to make the circular disk opaque, by means of a coating or otherwise, and to form thereon a transparent or translucent measuring "edge" (line) of spiral conformity. In this event, alignment of the edge of the inhibited zone will be accomplished relative to a visible zero indicia on one side and the fine illuminated line on the other side.

The means providing the zero indicia conveniently may be, rather than a line on the cabinet cover, an opaque member over (or under) the left portion of the elongated rectangular opening whereby a shadow having a distinct edge is formed; or it may consist of the left end of the opening itself, and consequently the shadow formed thereby.

The zero indicia may be provided with mechanical means for its movement toward and away from the edge of the spiral along the line of measurement, whereby fine adjustment of the zero indicia into alignment with the inhibited zone may be achieved. Such means would remove any necessity for exact aligning movement of the Petri dish either by hand or mechanically as described above, and the means for adjusting the zero indicia may be designed to accomplish a like adjustment of the rotatable assembly whereby corrections need not be applied to the indicated reading of the instrument.

I claim:

An inhibition zone reader comprising a cabinet having an opaque top cover, an opaque rotatable spiral measuring disk mounted within said cabinet parallel with and closely adjacent to said top cover, a light source within the cabinet below said spiral disk adapted to throw a shadow of said spiral disk onto said top cover, an elongated translucent portion in said top cover extending in a direction substantially perpendicular to the tangent to said spiral disk at the point where said elongated portion overlies the edge of said spiral disk, said portion being at least coextensive with and overlying the path generated by radial movement only of a point on said spiral disk as said spiral disk is turned whereby a segment of said shadow may be observed from without said cabinet, an index mark on said transparent portion adjacent the end of said portion furthest removed from the center of said spiral, a transparent circular disk mounted coaxially with said spiral disk adapted to actuate rotation of said spiral disk, said circular disk being of larger diameter than said spiral disk and extending at one point on its periphery out through an opening in the side of said cabinet whereby it is adapted for manual rotation, said disk being calibrated to indicate, in cooperation with an index line on said cabinet, the distance between said zero line and the nearest point on the periphery of said spiral disk.

JOHN H. BREWER.

REFERENCES CITED

The following references are of record in the file of this patent:

UNITED STATES PATENTS

| Number | Name | Date |
|---|---|---|
| 1,164,795 | Emerson | Dec. 21, 1915 |
| 1,803,284 | Parkhurst et al. | Apr. 28, 1931 |
| 2,054,697 | Fiala | Sept. 15, 1936 |
| 2,142,401 | Luhn | Jan. 3, 1939 |
| 2,146,599 | Smith | Feb. 7, 1939 |
| 2,476,899 | Norton | July 19, 1949 |

FOREIGN PATENTS

| Number | Country | Date |
|---|---|---|
| 255,014 | Italy | Oct. 4, 1927 |
| 293,975 | Great Britain | July 19, 1928 |
| 549,029 | Great Britain | Nov. 3, 1942 |